(12) United States Patent
Warnan et al.

(10) Patent No.: US 12,515,922 B2
(45) Date of Patent: *Jan. 6, 2026

(54) DEVICE FOR RECOVERING A VESSEL AT SEA

(71) Applicant: THALES, Courbevoie (FR)

(72) Inventors: François Warnan, Brest (FR); Olivier Jezequel, Brest (FR)

(73) Assignee: THALES, Courbevoie (FR)

( * ) Notice: Subject to any disclaimer, the term of this patent is extended or adjusted under 35 U.S.C. 154(b) by 740 days.

This patent is subject to a terminal disclaimer.

(21) Appl. No.: 17/787,304

(22) PCT Filed: Dec. 23, 2020

(86) PCT No.: PCT/EP2020/087809
§ 371 (c)(1),
(2) Date: Jun. 18, 2022

(87) PCT Pub. No.: WO2021/130333
PCT Pub. Date: Jul. 1, 2021

(65) Prior Publication Data
US 2023/0019770 A1    Jan. 19, 2023

(30) Foreign Application Priority Data

Dec. 26, 2019 (FR) ..................... 1915629

(51) Int. Cl.
*B66C 13/02* (2006.01)
*B63B 23/30* (2006.01)
*B63B 23/40* (2006.01)

(52) U.S. Cl.
CPC .............. *B66C 13/02* (2013.01); *B63B 23/30* (2013.01); *B63B 23/40* (2013.01)

(58) Field of Classification Search
CPC ... B63B 23/30; B63B 23/40; B63B 2027/165; B63B 27/36; B66C 13/02; B66C 23/18; B66C 13/46
(Continued)

(56) References Cited

U.S. PATENT DOCUMENTS 2,113,338 A * 4/1938 Wohldorf ............... B60D 1/025
   280/515
2,881,590 A * 4/1959 Zaskey ................. E02B 17/024
   405/209
(Continued)

FOREIGN PATENT DOCUMENTS

FR   3 062 844 A1   8/2018
GB   2 150 903 A    7/1985
(Continued)

*Primary Examiner* — Daniel V Venne
(74) *Attorney, Agent, or Firm* — BakerHostetler

(57) ABSTRACT

A device for recovering a vessel at sea from a surface station, the recovery device includes a cradle with negative buoyancy, intended to support the vessel, a lifting device comprising an upper frame and a set of hangers connecting the cradle to the upper frame, lengths of the hangers being variable so as to make it possible to raise and lower the cradle, a guide float capable of having a predetermined positive buoyancy, the guide float being interposed between the cradle and the upper frame so that the cradle is intended to support the guide float during the raising of the cradle, the guide float being configured and connected to the cradle in order to guide the vessel moving on the surface of the water with a speed of movement comprising a positive component along an axis x associated with the upper frame, toward a front part of the guide float when the guide float has the predetermined positive buoyancy, the guide float being in connection with three degrees of freedom in rotation with the cradle.

10 Claims, 12 Drawing Sheets

(58) Field of Classification Search
USPC ... 114/44, 51, 258, 259, 343, 362, 364, 365, 114/366, 375, 382
See application file for complete search history.

(56) References Cited

U.S. PATENT DOCUMENTS

| | | | | |
|---|---|---|---|---|
| 3,756,446 | A * | 9/1973 | Macrander | B63B 27/36 114/260 |
| 6,178,914 | B1 * | 1/2001 | Axelsson | B63B 23/06 114/248 |
| 6,840,188 | B1 * | 1/2005 | Witbeck | B63B 27/36 114/259 |
| 11,192,613 | B2 * | 12/2021 | Grall | B66C 13/02 |

FOREIGN PATENT DOCUMENTS

| | | |
|---|---|---|
| KR | 10-2034174 B1 | 11/2019 |
| WO | 89/09723 A1 | 10/1989 |

* cited by examiner

DEVICE FOR RECOVERING A VESSEL AT SEA

CROSS-REFERENCE TO RELATED APPLICATIONS

This application is a National Stage of International patent application PCT/EP2020/087809, filed on Dec. 23, 2020, which claims priority to foreign French patent application No. FR 1915629, filed on Dec. 26, 2019, the disclosures of which are incorporated by reference in their entirety.

FIELD OF THE INVENTION

The invention relates to the general field of recovering propelled surface vessels or propelled submarine vessels from a surface station. The surface station is, for example, a surface ship or a shore station, that is to say a station which is fixed with respect to the land, for example a maritime port.

The invention relates more particularly to devices for recovering vessels at sea which are installed on a surface station, as well as to methods for recovering vessels which use recovery devices of this type. The invention relates in particular to the raising of a ship from the level of the sea to a position located above the level of the sea, for example at the level of a platform of the surface station on which the vessel is intended to be stowed. The invention is particularly beneficial for the recovery of surface vessels from a surface ship, the vessel and the surface ship being capable of shifting with respect to one another while being on the same wave.

BACKGROUND

One major problem with operations of recovering a floating or submersible propelled marine craft consists in making the operation safe both for the operators who need to take part and for the equipment.

Before the recovery of a vessel from a surface ship, the vessel and the surface ship part are two mobile entities which react to different stresses and consequently have different and uncontrollable movements on the sea. So long as they are far apart from one another, they constitute bodies which do not risk colliding with one another. The risk of collision between these two bodies is high, particularly in a rough sea state, when a connection is being established between these two bodies. One solution for limiting the risk of collision when connecting these two bodies to one another is to ensure mechanical decoupling between these two bodies in order to limit the transmission of movements from one to another. This makes it possible to guarantee relative safety during recovery of the vessel in a rough sea state.

One example of a device that allows the recovery of a vessel from a surface ship to the made relatively safe is disclosed in the French Patent Application published in the name of the Applicant with the publication number FR3062844. This device comprises a basket intended to support the vessel to be recovered. The basket is connected to a rail which is fixed to the host ship and extends vertically in a calm sea state. The connecting means between the basket and the rail make it possible to ensure freedom of movement of the cradle in pitch, yaw, roll and heave. The device comprises a lifting device comprising an upper frame which is located above the cradle and is connected to the basket by hangers, the length of which is adjusted by winches. The basket can be raised by translation along the rail, from a position in which it floats on the surface of the water as far as an upper part of the rail, located above the main deck of the host ship.

The hangers are flexible elements which allow relative movement between the basket and the host ship while forming a permanent connection between the basket and the host ship. During the raising of the vessel to be recovered, once it is supported by the basket and connected to the rail, reducing the length of the hangers allows the movements of the host ship to be imparted progressively to the vessel to be recovered. The vessel to be recovered may then be fixed rigidly to the host ship with limited risks of shocks between these two interacting bodies.

In a rough sea, however, when the unit formed by the basket and the vessel to be recovered rises above the level of the sea, there is a risk that this unit will rock violently because it is no longer stabilized by the water. Stop elements are provided in order to restrict the yaw movements of the unit, but these stops constitute bodies against which the unit may collide, with risks of damage to equipment.

Furthermore, in Patent Application FR3062844 the basket may either float on the surface, which only makes it possible to recover surface vessels, or be submersible, which makes it possible to recover submarine and surface vessels but with a significant risk that the vessel N may strike the basket.

SUMMARY OF THE INVENTION

It is an object of the invention to limit at least one of the aforementioned drawbacks.

To this end, the invention relates to a device for recovering a vessel at sea from a surface station, the recovery device comprising:
  a cradle with negative buoyancy, intended to support the vessel,
  a lifting device comprising an upper frame and a set of hangers connecting the cradle to the upper frame, lengths of the hangers being variable so as to make it possible to raise and lower the cradle, a guide float capable of having a predetermined positive buoyancy, the guide float being interposed between the cradle and the upper frame so that the cradle is intended to support the guide float during the raising of the cradle, the guide float being configured and connected to the cradle in order to guide the vessel toward a front part of the guide float when the guide float has the predetermined positive buoyancy, the guide float being in connection with three degrees of freedom in rotation with the cradle.

Advantageously, the float is mobile in translation with respect to the cradle along an axis z associated with the upper frame, the axis z being vertical in a calm sea state.

Advantageously, the device comprises a connecting member with three degrees of freedom in rotation, which is capable of mechanically connecting the bow of the vessel to the front part of the guide float.

Advantageously, the guide float is resiliently deformable so as to dampen shocks between the vessel and the guide float.

Advantageously, the set of hangers comprises a first connecting hanger passing through a first opening formed in the float, the first opening fully enclosing the first connecting hanger radially.

The front part of the float is defined along an axis x which is associated with the upper frame and is horizontal in a calm sea state.

Advantageously, the set of hangers comprises a second connecting hanger passing through a second opening formed in the float, the second opening fully enclosing the second connecting hanger radially, the first connecting hanger exerting on the cradle a vertical traction at a point, at a distance along an axis y which is perpendicular to the axis x and is horizontal in a calm sea state, from another point at which the second connecting hanger exerts a vertical traction on the cradle when the first connecting hanger and the second connecting hanger are under tension.

Advantageously, the guide float has an overall U-shape comprising a bottom arranged substantially next to the front of the cradle and two lateral parts which each extend longitudinally from the bottom to a rear end located behind the bottom along the axis x, the lateral parts being separated in a calm sea state by a vertical plane comprising the axis x and passing through the bottom.

Advantageously, the device comprises: a first connecting piece in connection with three degrees of freedom in rotation with the cradle, a guide making it possible to guide the connecting piece in translation with respect to the upper frame, during a variation of the lengths of the hangers, along an axis z associated with the upper frame.

Advantageously, the device comprises a first connecting member connecting a front region of the cradle to the first connecting piece.

Advantageously, the device comprises: a second connecting piece in connection with three degrees of freedom in rotation with the guide float, another guide making it possible to guide the second connecting piece in translation with respect to the upper frame, during a variation of the lengths of the hangers, along an axis z associated with the upper frame.

Advantageously, the device comprises a second connecting member connecting a front region of the float to the second connecting piece.

Advantageously, the second connecting piece is the first connecting piece and the other guide is the guide.

BRIEF DESCRIPTION OF THE DRAWINGS

Other characteristics, details and advantages of the invention will become apparent upon reading the description and referring to the appended drawings, which are given by way of example and which respectively represent.

From one figure to another, elements which are the same are denoted by the same references.

DETAILED DESCRIPTION

The invention relates to a device for recovering a self-propelled vessel, that is to say a vessel comprising a propulsion means, from a surface station on which the recovery device is mounted. The surface station may be a surface ship, as in the nonlimiting example of the figures.

The surface station is for example, as a variant, a station which is fixed with respect to the land, for example a quay of a maritime port.

The invention applies, for example, to the recovery of autonomous craft or remote-controlled craft.

The vessel to be recovered is for example a self-propelled surface vessel, for example an USV (unmanned surface vehicle) or a submersible vessel, for example of the UUV (unmanned underwater vehicle) type.

Figure 1:
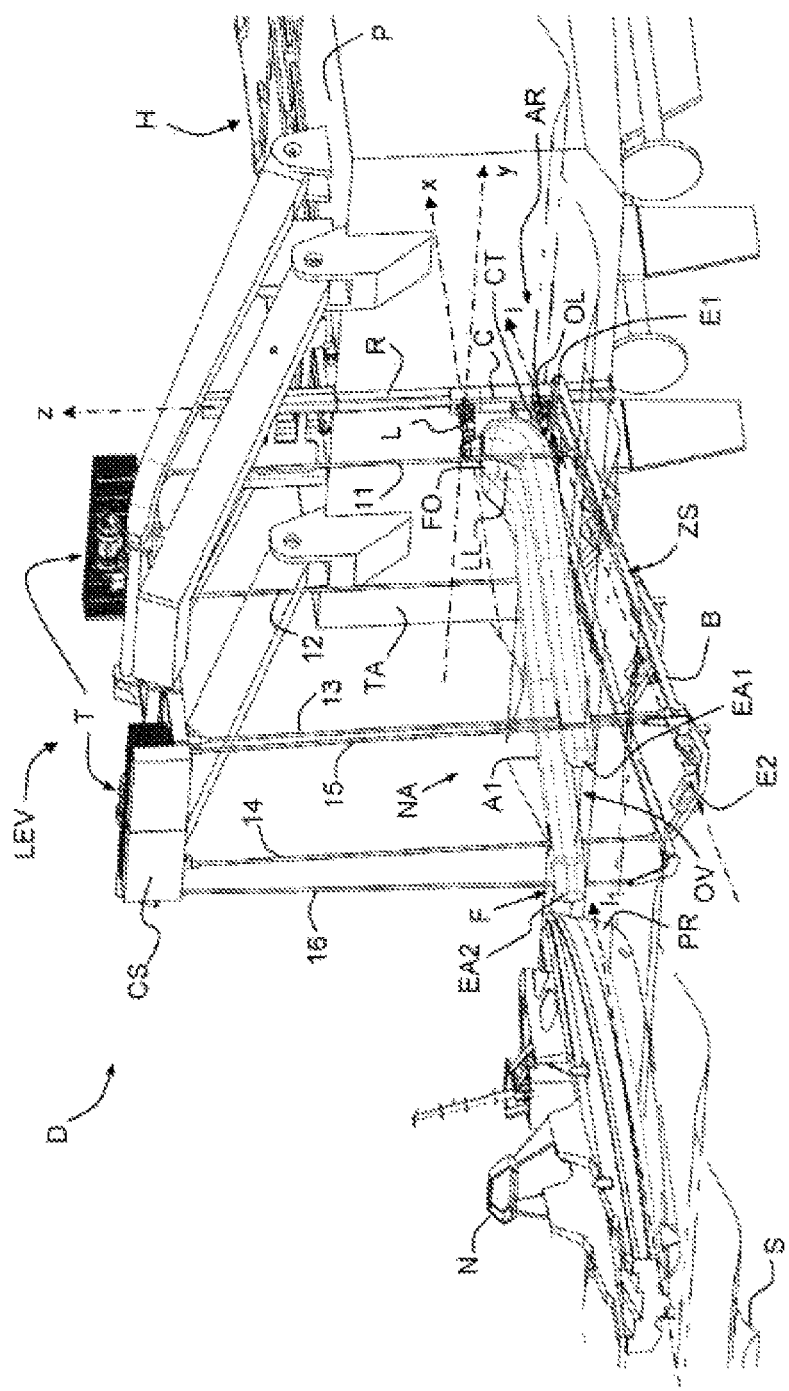
FIG. 1 is a schematic illustration of a device for recovering a vessel according to the invention in a reception configuration, when the cradle is in a receiving orientation, before reception of a vessel.

FIG. 1 schematically represents an example of a device D for recovering an immersed vessel N which is at the level of the surface S of the water (level of the sea), from a surface ship H, referred to in the rest of the text as a host ship. The device D is mounted on the host ship H.

As may be seen in FIG. 1, the device D comprises a basket NA comprising a cradle B intended to support the vessel N so as to make it possible to raise the vessel N as a result of raising the cradle B.

The cradle is advantageously in the form of a frame intended to have a substantially fixed shape during the operation of the raising device. In other words, the cradle is intended not to deform during the recovery and the raising of the vessel.

The cradle is, for example, in the form of a metal frame.

Advantageously, the device is configured so that the vessel N is intended to rest on the cradle under the effect of gravity during the raising. The vessel N then bears on the cradle B along the axis z.

The cradle B preferably has a negative buoyancy, which makes it possible to recover a submarine vessel N sailing under water. As a variant, the cradle B has a positive buoyancy, which makes it possible only to recover a vessel N sailing on the surface. A zero buoyancy may also be envisioned.

The recovery device is intended to raise the cradle B, and therefore the vessel N resting on the cradle B, from the level of the sea or from a fully immersed position located below the level of the sea to a raised position in which the cradle B is facing the sea, above the level of the sea.

The raised position is advantageously a position located above a platform of the surface station along a vertical axis, so that the vessel N can be stowed on the platform from the raised position. In the example of the figures, the recovery device D is capable of raising the vessel N from the level of the sea to a raised position with a height greater than the main deck P of the host ship H, on which deck the vessel N is intended to be stowed. The height of a point is defined along an axis which is vertical with respect to the level of the sea. It is positive when the point is located at the level of the sea and negative when the point is located below the level of the sea.

As a variant, the platform is for example a platform of a quay of a maritime port. Advantageously, but not necessarily, the recovery device is capable of bringing the vessel into a stowing position on the deck of the vessel from the raised position by translation of the vessel N along an axis which is horizontal in a calm sea state, as is described in Patent Application FR3062844.

In order to make it possible to raise the cradle B, the recovery device D comprises a lifting device LEV, which is mounted on the host ship H and comprises an upper frame CS and a set of hangers 11 to 16 connecting the upper frame CS to the cradle B.

The recovery device D is capable of being in a recovery configuration as represented in FIGS. 1 to 11, in which the cradle B is facing the sea, the upper frame CS is fixed with respect to the host ship H and is facing the cradle B, and in which the hangers 11 to 16 connect the upper frame CS to the cradle B.

In this configuration, when the hangers are tensioned, the cradle B is suspended from the upper frame CS by the hangers 11 to 16.

The lengths of the hangers 11 to 16 are variable so as to make it possible to vary a distance of the cradle B from the upper frame CS along a vertical axis by variations of the lengths of the hangers. A length reduction of the hangers makes it possible to raise the cradle B toward the upper frame CS. A length increase of the hangers makes it possible to lower the cradle B by moving it away from the upper frame CS.

The lifting device LEV makes it possible to raise the cradle B from the level of the sea or from a position in which the cradle B is fully immersed and below the surface of the water, to the raised position, when the device D is in the recovery configuration, under the effect of a length variation of hangers 11 to 16 of the set, and more particularly under the effect of a reduction of their length.

In the recovery configuration, the lifting device advantageously but not necessarily makes it possible to lower the vessel N from the raised position to the level of the sea or to a fully immersed position located below the level of the sea. The recovery device is then also a device for launching the vessel N. This is also obtained by a variation of the length of hangers of the set, and more particularly under the effect of an increase of the length of these hangers.

The device D also comprises means REG for adjusting the lengths of the hangers, which are configured to make it possible to adjust the lengths of the hangers independently of one another.

Figure 2:
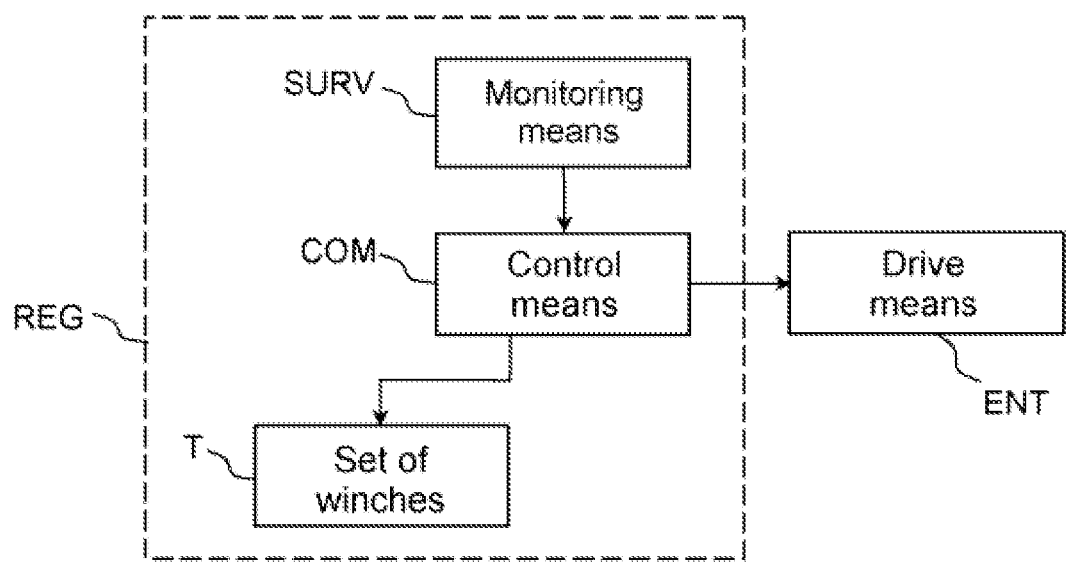
FIG. 2 is a block diagram of the means of the recovery device according to the invention.

The adjustment means REG comprise a set T of motorized winches, as may be seen in FIG. 2, making it possible to vary the lengths of the hangers independently, and control means COM making it possible to control the winches of the winch set T, as may be seen in FIG. 2.

The set T of winches comprises, for example, one winch per hanger, each winch being capable of adjusting the length of a single hanger. The winches of the set T are controllable independently of one another by winch control means.

In addition to the hangers, the recovery device comprises a fastening AR connecting a first fastening point CT of the cradle B to the host ship H permanently during the raising of the cradle B.

The fastening AR comprises a connecting member OL connecting the first fastening point CT of the cradle B to a second fastening point C which, in the recovery configuration, is fixed with respect to the upper frame CS (that is to say with respect to the host ship H) in translation along an axis x and/or along an axis y, which are associated with the upper frame CS and are horizontal in a calm sea state, so that the first fastening point CT is in connection with at least three degrees of freedom with the second fastening point C. Thus, the connecting member connects the cradle B flexibly to the host ship H. The cradle B is caused to rock around the second fastening point C in an agitated sea state.

The vertical direction is defined by the force of gravity. This direction is perpendicular to the surface of the sea in a calm sea state. The surface of the sea in a calm sea state defines the horizontal plane. The state of the sea is defined on the Douglas scale. Calm sea corresponds to a sea state of zero.

In the nonlimiting example of the figures, the first fastening point CT is a front region of the cradle B along the axis x.

In this case, the second fastening point C is, for example, located in front of the first fastening point CT along the axis x.

In the nonlimiting example of the figures, the first fastening point is a central point of a longitudinal end E1 of the cradle B. In other words, the first fastening point CT is located substantially at the center of the front end E1 of the cradle B, along the axis y in a calm sea state.

In the nonlimiting example of the figures, the fastening AR comprises a connecting member OL connecting the first fastening point CT to a first fastening point C, which is a connecting piece C, so that the connecting piece C is in connection with three degrees of freedom in rotation with the cradle B.

The connecting piece C is connected to a guide R which is fixed to the host ship H, that is to say to the frame CS, and makes it possible to guide the connecting piece C in translation along an axis z with respect to the upper frame CS during a length variation of the hangers, when the recovery device is in the recovery configuration.

In the nonlimiting example of FIG. 1, the guide R is in the form of a rail R running along a longitudinal axis, which is the axis z. The connecting piece C is in connection with three degrees of freedom in rotation with the cradle B and in sliding connection with the rail R along the axis z by means of. The connecting piece C is connected to the cradle B while allowing these degrees of freedom of movement by means of a connecting member OL. The rail R is fixed with respect to the host ship H when the recovery device D is in the recovery configuration and is arranged so that the axis z extends substantially vertically in a calm sea state. The cradle B is then connected to the host ship H by means of the rail R and the connecting piece C.

Thus, the cradle B is in connection with one degree of freedom in translation along the axis z with the host ship H (or the upper frame CS) and with three degrees of freedom in rotation with the host ship H (or the upper frame CS).

As seen above, the degree of freedom in translation along the axis z makes it possible to translate the cradle B with respect to the host ship H and with respect to the upper frame CS along the axis z. The three degrees of freedom in rotation ensure a certain degree of decoupling of the movements of the cradle B with respect to those of the host ship H. Thus, when the vessel N is resting on the cradle B, the risks of shocks between the vessel N and the host ship H in an agitated sea state are limited, while the recovery device D ensures continuous connection between the host ship and the vessel N. The limitation of the relative movements between the vessel N and the host ship H may then take place progressively without bumping.

The recovery device D also comprises connecting means making it possible to connect the bow PR of the vessel N to the cradle B so as to prevent movement of the vessel N with respect to the cradle B forward along the axis x.

Figure 5:
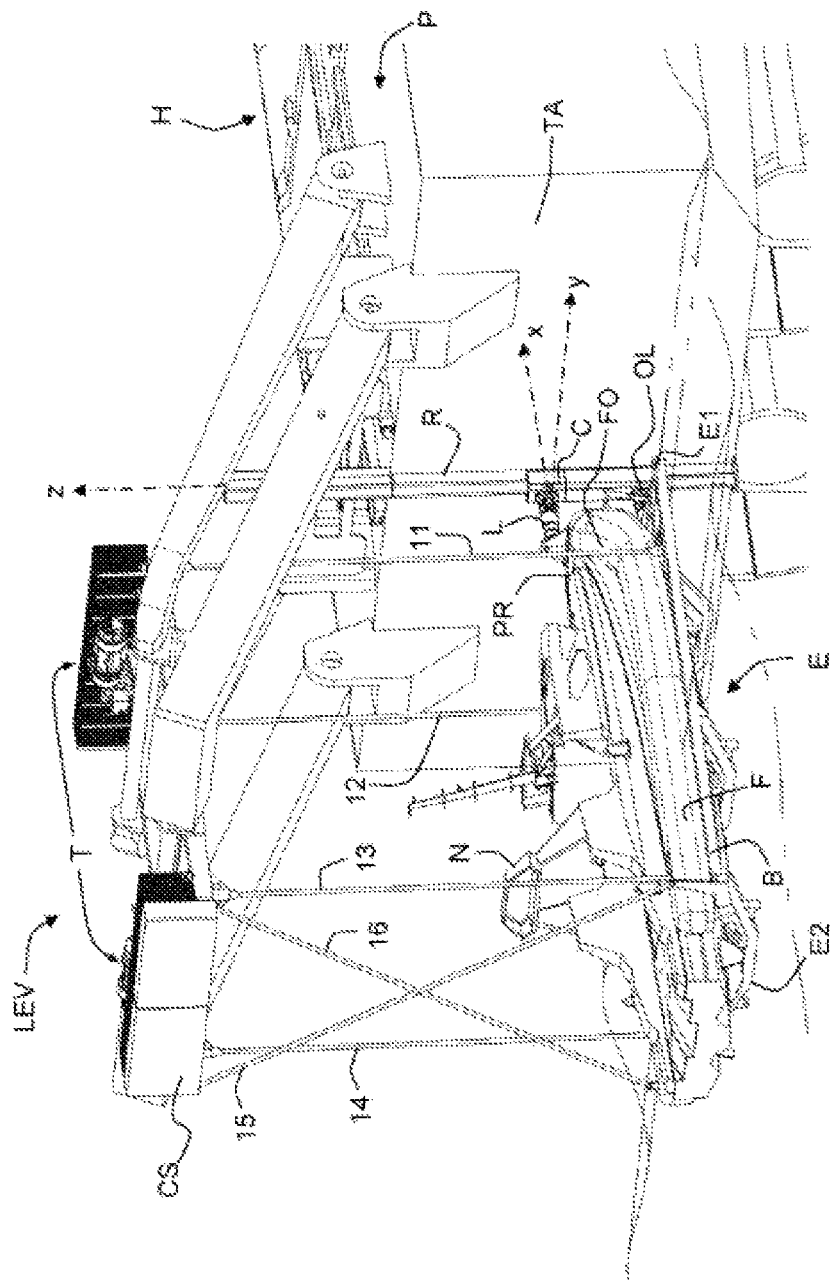
FIG. 5 is a schematic illustration of the device for recovering a vessel according to the invention in the reception configuration, when the cradle is in a raising orientation, after reception of a vessel, the stabilizing hangers being in a stabilization configuration.

In order to make the raising of the vessel N safe when the latter is supported by the cradle B and connected to the host ship H, according to the invention the set of hangers of the device D comprises stabilizing hangers 15, 16 that are capable of being in a stabilizing configuration, which may be seen in FIG. 5, in which they are under tension, in which they extend linearly and in which their orthogonal projections onto a transverse plane (y, z) associated with the upper frame CS, and therefore with the host ship H, and defined by the axis y and the axis z, are inclined with respect to one another. In other words, the first orthogonal projection of the first stabilizing hanger 15 onto the transverse plane (y, z) is inclined with respect to the second orthogonal projection of the second stabilizing hanger onto the transverse plane (y, z). In the stabilizing configuration, the stabilizing hangers limit the rocking of the cradle B with respect to the host ship H, in particular its component about the axis z.

This limitation of the rocking is particularly advantageous when the cradle B is out of the water.

It should be noted that "the hangers extend linearly" is intended to mean that the hangers extend longitudinally along a single straight line.

In the advantageous embodiment of the figures, the stabilizing hangers 15, 16 are capable of being in a stabilizing configuration in which the first orthogonal projection of the first stabilizing hanger 15 onto the transverse plane (y, z) intersects the second orthogonal projection of the second stabilizing hanger onto the transverse plane (y, z). The stabilizing hangers 15, 16 then make it possible to ensure good limitation of the rocking of the cradle B with respect to the host ship H while occupying a restricted volume.

In the nonlimiting embodiment of the figures, the recovery device is configured to recover at sea a vessel N moving at sea toward the connecting piece C, in a calm sea state, preferably or essentially along an axis of advance parallel to an axis x, represented in FIG. 1, associated with the upper frame CS and perpendicular to the axis z. The direction of movement parallel to the axis x is defined as being movement from the rear forward.

For example, the cradle B extends longitudinally, that is to say runs, along a longitudinal axis l of the cradle B, from the front end E1 of the cradle B to a rear end E2 of the cradle B, and the axis l is capable of being substantially parallel to the axis x in a calm sea state when the recovery device is in the recovery configuration. The front end E1 is located in front of the rear end E2 along the axis x.

As a variant, the cradle B has substantially identical dimensions along the axis x and the axis y in a calm sea state when the axis l is substantially horizontal. In another variant, the dimension of the cradle B along the axis x is less than the dimension of the cradle B along the axis y in a calm sea state when the axis l is substantially horizontal.

The cradle B advantageously, but not necessarily, has an overall shape of a vessel hull, which is open and intended to substantially match the shape of the vessel N when the latter is resting on the cradle B so as to block the transverse movements of the vessel N with respect to the cradle B. The transverse movements are movements of the vessel N along the axis y in a calm sea state. The axis y is perpendicular to x and z. This makes it possible to ensure a substantially fixed position of the vessel N with respect to the cradle B when the vessel N is resting on the cradle B during the raising of the cradle B, particularly in a calm sea state.

In the case of recovery from the host ship H, the recovery device D is advantageously mounted on the host ship H so that the axis x is parallel to a principal movement axis p along which the host ship H is intended principally to move. The axis p extends in the direction from the rear to the front of the host ship H. It is generally, but not necessarily, a longitudinal axis of the host ship H, along which the host ship H extends longitudinally.

The reception device D is advantageously mounted on the host ship H so that the cradle B, or its support region ZS on which the cradle B is intended to support the vessel N, extends entirely behind a stern transom TA of the host ship H when the reception device is in a recovery configuration. This makes it possible to recover the vessel N from the stern of the host ship H.

As a variant, the reception device D is mounted on the host ship H so that the cradle B is arranged on one side of the host ship H, that is to say beside the host ship H along the axis y. The reception device D then makes it possible to recover a vessel N moving parallel to the principal axis p and arriving beside the host ship H along the axis y.

We will now describe in more detail the recovery device according to the invention and the associated recovery method.

Figure 3:
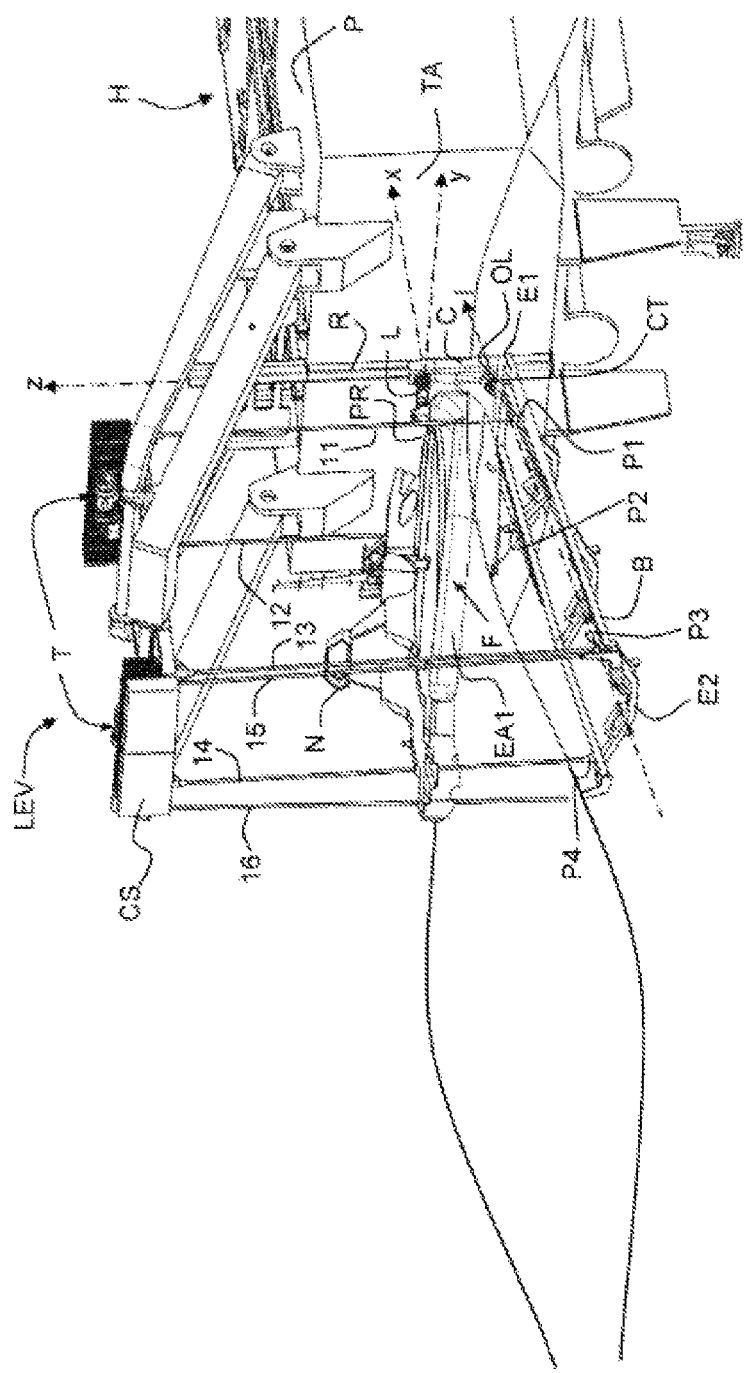
FIG. 3 is a schematic illustration of the device for recovering a vessel according to the invention in the reception configuration, when the cradle is in a receiving orientation, after reception of a vessel.

In FIG. 3, the device D is represented schematically during a phase of receiving the vessel N, during which the vessel N comes to be positioned above the cradle B, between the cradle B and the upper frame CS.

During the phase of receiving the vessel N, the stabilizing hangers 15, 16 are advantageously maintained in a resting configuration represented in FIG. 3, in which the stabilizing hangers 15, 16 are tensioned and are substantially parallel to one another, that is to say more generally in which a third orthogonal projection of the first hanger is substantially parallel to the orthogonal projection of the second hanger onto the transverse plane (y, z), and are spaced apart along the axis y. By this possibility of the stabilizing hangers 15, 16 being in the resting configuration, it is possible not to hamper the vessel N in its movement along the axis x toward the guide R.

In a receiving orientation as represented in FIG. 3, the cradle B has a positive trim. In other words, in the receiving orientation the rear end E2 of the cradle B is located at a lower height than the end E1. In other words, the end E2 is located at a greater depth than the end E1. This receiving orientation allows the arrival of the vessel N next to the cradle B, above the cradle B, when the vessel N is moving along the axis x to be facilitated and made safe. This is because this receiving orientation distances the cradle B from the volume which the AUV can enter in order to come next to the cradle B, which makes it possible to limit the risks of shocks and friction between the vessel N and the cradle B during this operation. The risks of damage to the vessel N are thus limited.

When the vessel N comes to abut against a stop FO, which will be described below, located in front of the vessel N along the axis x, the connecting means connect the bow PR of the vessel N to the cradle B so as to prevent movement of the vessel N with respect to the cradle B along an axis x forward.

The lifting device LEV comprises a set of hangers 11 to 16 comprising raising hangers 11 to 14 and stabilizing hangers 15, 16.

The hangers 11 to 16 are arranged and connected to the hanger B so as to make it possible to raise the cradle B with a zero list, the cradle B then being substantially symmetrical with respect to a vertical plane passing through the axis l in a calm sea state, and so as to make it possible to vary a trim of the cradle B by adjusting the lengths of the hangers.

In order to make it possible to adjust the trim of the cradle B, the set of hangers comprises at least two hangers which are connected to the cradle B so as to exert respective vertical tractions on the cradle B at respective points spaced apart along the axis l or, more generally, along the axis connecting the ends E1 and E2 of the cradle B. This arrangement makes it possible to change the cradle B from the receiving orientation of FIG. 3 to a raising orientation of FIG. 4, in which the cradle B has a zero trim in a calm sea state.

In order to make it possible to raise the cradle B with a zero list in a calm sea state, the set of hangers 11 to 16 comprises at least two hangers connected to the cradle B so as to exert respective vertical tractions on the cradle B at respective points spaced apart along the axis y in a calm sea state.

Advantageously, the raising hangers are configured in these two ways. As a variant, it is the set of hangers, including the stabilizing hangers, which is configured in these two ways, in which case the number of hangers may be less.

In the nonlimiting example of the figures, the set of hangers comprises two pairs of raising hangers 11, 12 and 13, 14.

The hangers 11 and 12 of the first pair of hangers exert vertical tractions on the cradle B at points P1 and P2, respectively, which may be seen in FIG. 3, located in proximity to the end E1, substantially at the same distance from the end E1. The hangers 13 and 14 of the second pair of hangers exert vertical tractions on the cradle B at points P3 and P4, which may be seen in FIG. 1, located in proximity to the end E2, substantially at the same distance from the end E2. The two hangers of each pair of raising hangers 11 and 12 (and respectively 13 and 14) exert vertical tractions on the cradle B at points P1 and P2 (and respectively P3 and P4) which are spaced apart along the axis y in a calm sea state and arranged on either side of the plane (x, z) passing through the connecting piece C in a calm sea state. Advantageously, P1 and P2 (and respectively P3 and P4) are separated, in a calm sea state, by a plane which is parallel to the axes x and z and passes through the connecting piece C.

Figure 4:
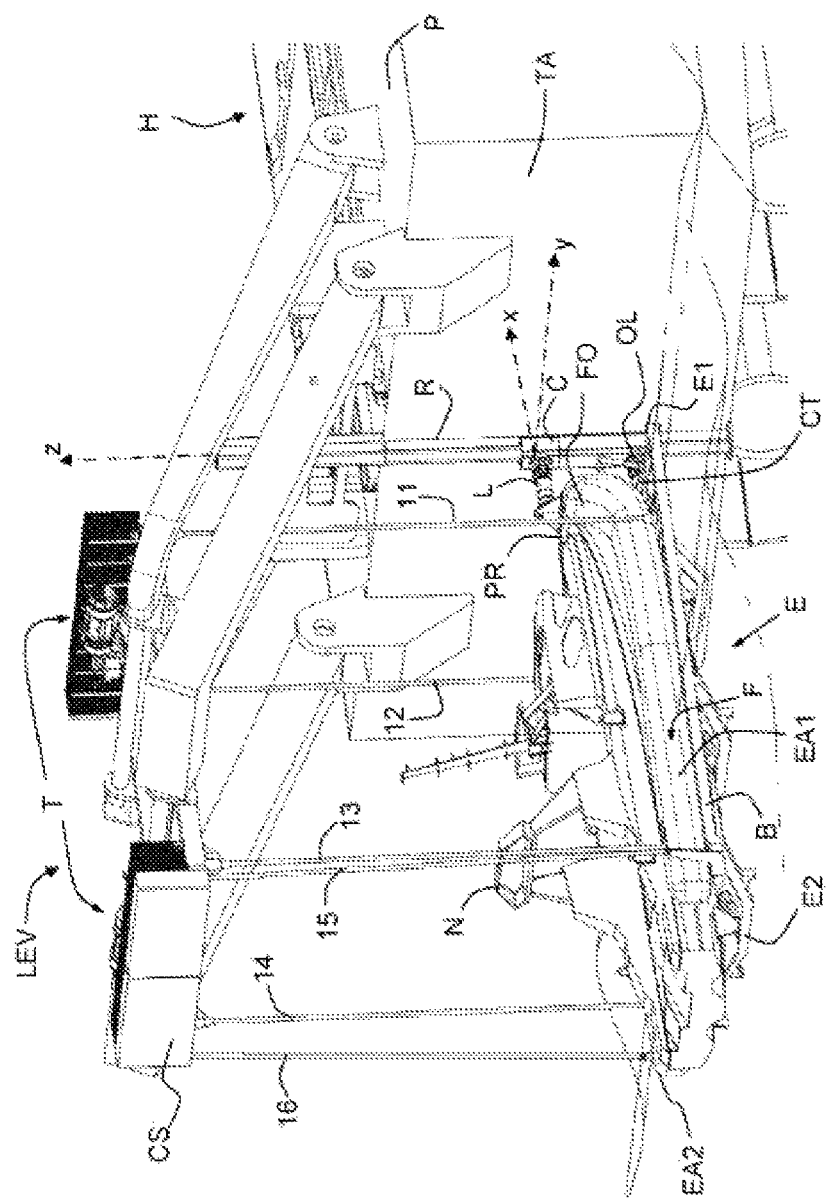
FIG. 4 is a schematic illustration of the device for recovering a vessel according to the invention in the reception configuration, when the cradle is in a raising orientation, after reception of a vessel.

In order to change the cradle B from the receiving orientation of FIG. 3 to the raising orientation of FIG. 4, the length of the hangers 13 to 14 and preferably 13 to 16 is reduced.

The vessel N comes to rest on the cradle B so as to have a substantially fixed position with respect to the cradle B.

The length of the hangers of the set is then reduced so as to raise the cradle B into its raising orientation by sliding along the axis z.

The movements of the vessel N start to be controlled by the hangers 11 to 16 because of the vertical traction which they exert on the cradle B. The unit E formed by the cradle B and the vessel N, connected to the cradle B and resting on the cradle B, may still rock with respect to the host ship H under the effect of the waves because of the connection with three degrees of freedom in rotation, which ensures a certain degree of flexibility for the connection.

When the unit E arrives above the surface of the water. The rocking of the cradle B with respect to the host ship H is no longer dampened and may even be amplified by resonance.

In order to limit the rocking of the unit E with respect to the host ship, in particular its component about the axis z, during the raising, the stabilizing hangers 15 and 16 are brought into the stabilizing configuration as represented in FIG. 5.

Figure 6:
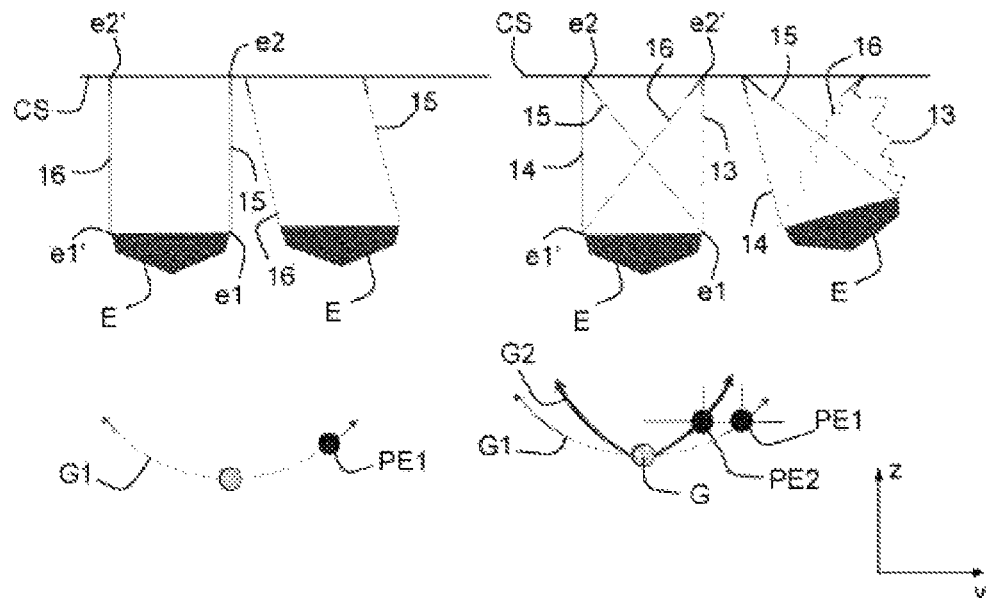
FIG. 6 illustrates the rocking of a unit formed by the cradle and the vessel resting on the cradle, when the stabilizing hangers are parallel to one another (left) and when their projections onto a plane (y, z) intersect (right), FIG. 7 schematically represents successive views a to f, in the plane (y, z), of the raising of the unit formed by the vessel and the cradle by retensioning the hangers which relax under the effect of the rocking of the unit with respect to the host ship, FIG. 8 schematically represents the rocking of the unit with respect to the host ship in perspective, FIG. 9 schematically represents projections of the stabilizing hangers in the stabilization configuration onto the plane (y, z)
Figure 7:
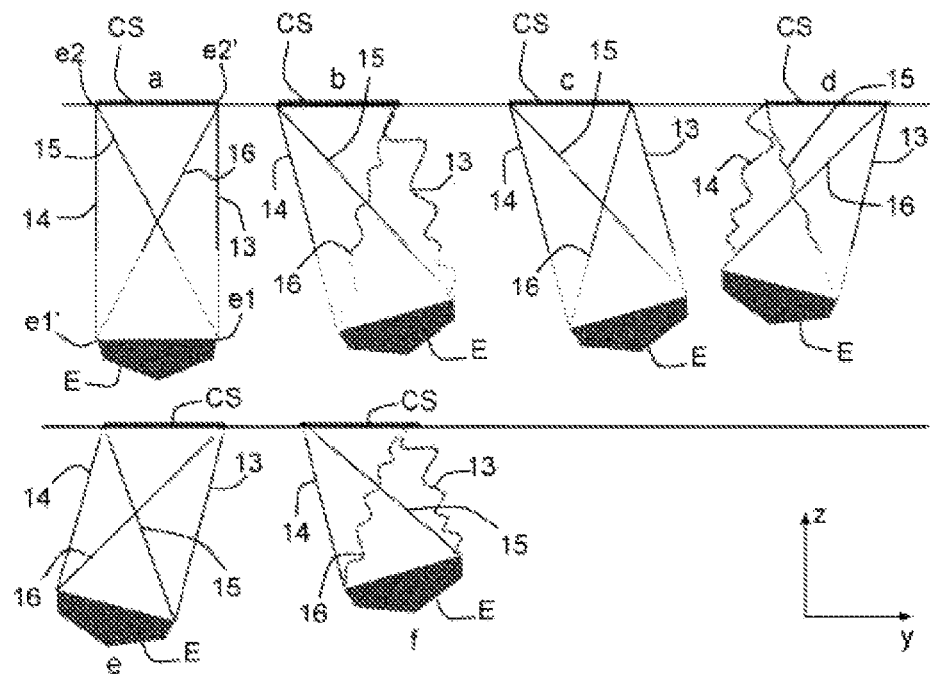

To this end, as may be seen in FIGS. 6 and 7, the stabilizing hangers 15, 16 each comprise for example a first longitudinal end e1, e1' fixed to the cradle B and a second longitudinal end e2, e2' connected to the upper frame CS. The lifting device LEV comprises drive means ENT, referenced in FIG. 2, making it possible to change the stabilizing hangers 15 and 16 from the resting configuration to the stabilizing configuration by moving the two ends e2, e2' of each of the stabilizing hangers 15, 16 in the opposite direction along the axis y, in order to bring the stabilizing hangers 15, 16 into the stabilizing configuration of FIG. 5. The second end e2, e2' of each stabilizing hanger 15, 16 is moved so as to approach, along the axis y, the position occupied by the second and e2', e2 of the other stabilizing hanger in the resting configuration.

As may be seen in FIG. 2, control means COM are capable of controlling the drive means ENT.

By bringing the stabilizing hangers 15, 16 into the stabilizing configuration, the rocking of the unit E with respect to the host ship H is limited. This is because when the orthogonal projections of the stabilizing hangers 15, 16 onto the plane (y, z) intersect or, more generally, when they are inclined with respect to one another, movement of the center of gravity of the unit E is made more difficult. As represented in FIG. 6, left, when the stabilizing hangers 15, 16 are parallel to one another or in the absence of stabilizing hangers, the center of gravity G of the unit E moves on a first trough G1 in a first plane parallel to (y, z) to an extreme position PE1. The cradle B, which is connected to the rail R at the front by a connection with three degrees of freedom in rotation, experiences rocking which is a combination of the movements about the three axes, and in particular about the axis z. When the projections of the tensioned stabilizing hangers 15, 16 are inclined with respect to one another, the center of gravity of the unit moves in a second trough G2 represented in FIG. 6, right, to an extreme position PE2. This phenomenon is accentuated when the raising of the cradle B continues, the slopes of the trough on which the center of gravity can move becoming steeper. Thus, the recovery device D according to the invention allows the rocking of the unit E with respect to the rail R about the axis z to be made increasingly constrained as the raising continues. The constraints on the movement of the unit E with respect to the host ship H increase slowly and progressively while avoiding the fitting of a stop, which would limit its rocking but which the vessel N could strike with risks of damage to the vessel N.

Furthermore, this solution does not require heavy or bulky shock absorbers for dampening the rocking movement of the unit by dissipating energy. This solution is based on hangers which are lightweight and compact.

This solution also makes it possible to benefit from the natural rocking of the cradle B with respect to the host ship H under the effect of the waves, in order to facilitate the raising of the unit E and in order to raise the unit E gently by benefiting from the alternating phases of tension and relaxation of the hangers. A particular configuration of the set of winches T and of the means COM controlling the set of winches may be employed for this purpose.

Specifically, when the cradle B is in connection with three degrees of freedom in rotation with the rail R fixed to the host ship H, the relative rocking of the unit E with respect to the host ship H is rocking about the axes x, y and z. This rocking comprises a component about the axis z, which leads to relaxation of some of the hangers, as may be seen in view b of FIG. 7. Now, this rocking under the effect of the waves takes place without work on the part of the winches T. Thus, by controlling the set of winches T so that, each time the unit E rocks with respect to the rail R, the hangers which relax or tend to relax under the effect of the rocking of the unit E, as represented by views c and e of FIG. 7, are retensioned or kept under tension instead of being allowed to relax, as represented in views b, d and f of FIG. 7, the unit E is raised while limiting the energy necessary for this raising. The rocking of the unit E with respect to the host ship H is represented in perspective in FIG. 8.

The particular control described above furthermore makes it possible to suppress the rocking of the unit E. Specifically, by retensioning or keeping under tension the hangers which relax or tend to relax under the effect of the rocking of the unit E in a first direction, this is equivalent to withdrawing potential energy from the unit E when the latter arrives at an extreme position in which its kinetic energy is zero. The energy of the unit E at this end point is its potential energy. Reducing the potential energy of the unit E leads to a reduction of its total energy. The effect of this energy reduction is to reduce its maximum kinetic energy. Thus, the speed and the amplitude of the rocking of the unit E decrease progressively at each rock.

Thus, the means REG for adjusting the lengths of the hangers are advantageously configured to keep the hangers 11 to 16 substantially tensioned, that is to say under tension, permanently or at least during a phase of raising the cradle B or the unit E starting when the cradle B is immersed, or at least during a phase of raising the cradle B or the unit E starting when the cradle B is out of the water.

Preferably, in order to avoid any slack of the hangers liable to cause irregular windings of the filamentary cables forming the hangers 11 to 16 on the winches of the set T, the adjustment means REG are configured to keep the hangers 11 to 16 tensioned, that is to say under tension, permanently or at least during a phase of raising the cradle B when the cradle B is immersed, or at least during a phase of raising the cradle B or the unit E starting when the cradle B is out of the water.

Preferably, the adjustment means REG are configured to keep each hanger under constant tension.

It should be noted that if only the natural rocking of the unit E is used in order to raise it, it is not possible to raise the unit E in a calm sea state because the unit E does not rock with respect to the host ship H.

Advantageously, the adjustment means REG are configured to reduce the length of each of the hangers 11 to 16 continuously during a stabilized raising phase, during which the stabilizing hangers are in the stabilizing configuration.

In other words, during the stabilized raising phase, the adjustment means REG are configured to keep the hangers 11 to 16 substantially under tension, for example by increasing the rate of reduction of the lengths of the hangers which relax or which tend to relax under the effect of the rocking of the cradle B with respect to the host ship H, while continuing to reduce the lengths of the hangers which become tensioned under the effect of the rocking of the cradle B with respect to the host ship H.

For example, during the raising process the adjustment means REG are configured to reduce the length of each hanger at a predetermined fixed rate of raising the hanger in question in the absence of rocking of the cradle B with respect to the rail R, then the adjustment means are configured so as to reduce the length of each hanger which tends to become tensioned under the effect of the relative rocking of the cradle B and the rail R at a rate higher than the predetermined rate, and so as to reduce the length of each hanger which tends to relax under the effect of the relative rocking of the cradle and the rail R at a rate lower than the predetermined rate.

To this end, the adjustment means REG comprise, as may be seen in FIG. 2, means SURV for monitoring the tension of the hangers 11 to 16, making it possible to measure a physical quantity representative of the tensions of the hangers, that is to say of the inclination of the cradle B with respect to the host ship H, for example about the axis z. These monitoring means SURV comprise, for example, an inclinometer making it possible to measure an inclination of the hangers, an acceleration sensor, a first inertial measurement instrument making it possible to measure an orientation of the cradle and/or a second inertial measurement instrument making it possible to measure an orientation of the host ship H, at least one tension sensor, each tension sensor making it possible to measure the tension of a hanger. The orientation of the host ship and/or of the cradle may, as a variant, be measured on the basis of one or more acceleration sensors and/or one or more gyrometers, each making it possible to measure a component of an angular velocity vector, and/or on the basis of a position sensor.

The invention also relates to a method for stabilizing the cradle B or the unit E, consisting in keeping the hangers 11 to 16 of the set of hangers substantially under tension, and preferably under tension, during a relative rocking of the cradle B with respect to the host ship H, the recovery device being in the recovery configuration, the stabilization method comprising a step consisting in bringing the stabilizing hangers from the resting configuration to the stabilizing configuration.

Advantageously, the stabilization method is carried out when the cradle B extends above the level of the sea, that is to say when its support region ZS extends above the level of the sea.

The invention also relates to a method for raising the cradle B or the unit E, the recovery method comprising a step of stabilized raising of the cradle or the unit E, for example from the level of the sea or from a level below or above, to a raised position located above the level of the sea, during which the hangers 11 to 16 are kept substantially under tension, and preferably kept under tension, while the cradle B slides along the axis z toward the upper frame CS, the recovery device D being in the recovery configuration and the stabilizing hangers being in the stabilizing configuration.

In the case in which the hangers are capable of changing from a resting configuration to the stabilizing configuration, the method comprises a placement step prior to the step of stabilization or stabilized raising, consisting in putting the hangers into the stabilizing configuration.

Preferably, the hangers are in the stabilizing configuration throughout the time of the raising step or until the end of the raising procedure, starting from the moment when the cradle B is located above the level of the sea (that is to say is out of the water) or starting from the moment when the cradle B is located at the level of the surface of the water or starting from a position in which the cradle B is fully immersed.

Preferably, the hangers are kept under constant tension throughout the time of the stabilized raising step and/or the stabilization procedure.

Advantageously, the length of each of the hangers 11 to 16 of the set is reduced continuously during the stabilized raising step. In other words, the rate of reduction of the length of each of the hangers is nonzero and positive during the raising step.

The method advantageously comprises a step during which the cradle is changed from a receiving orientation to a resting orientation by adjusting the lengths of the hangers. This step is prior to the stabilized raising step and preferably prior to the step during which the stabilizing hangers are put in the stabilizing configuration.

It should be noted that the inclination of the projections of the stabilizing hangers 15, 16 onto the transverse plane (y, z) with respect to one another also makes it possible to limit the rocking of the cradle B, in particular the component of the rocking about the axis z, with respect to the host ship H outside the raising phases by configuring the adjustment means appropriately.

In the nonlimiting example of the figures, the stabilizing hangers 15, 16 are connected to the cradle B so that each exerts a vertical traction on the cradle B, substantially at the level of the end E2 of the cradle B.

In other words, more generally, the stabilizing hangers 15, 16 are connected to the cradle B so that each exerts a vertical traction on the cradle B at a distance from the first point along the axis x perpendicular to the plane (y, z) in a calm sea state, and preferably substantially at the level of an end furthest away from the first fastening point along the axis x perpendicular to the plane (y, z) in a calm sea state. This makes it possible to limit the rocking of the cradle B with respect to the host ship efficiently.

As a variant, the stabilizing hangers 15, 16 each exert a vertical traction on the cradle B at a distance from the end E2 and from the end E1 along the axis l.

Figure 9:
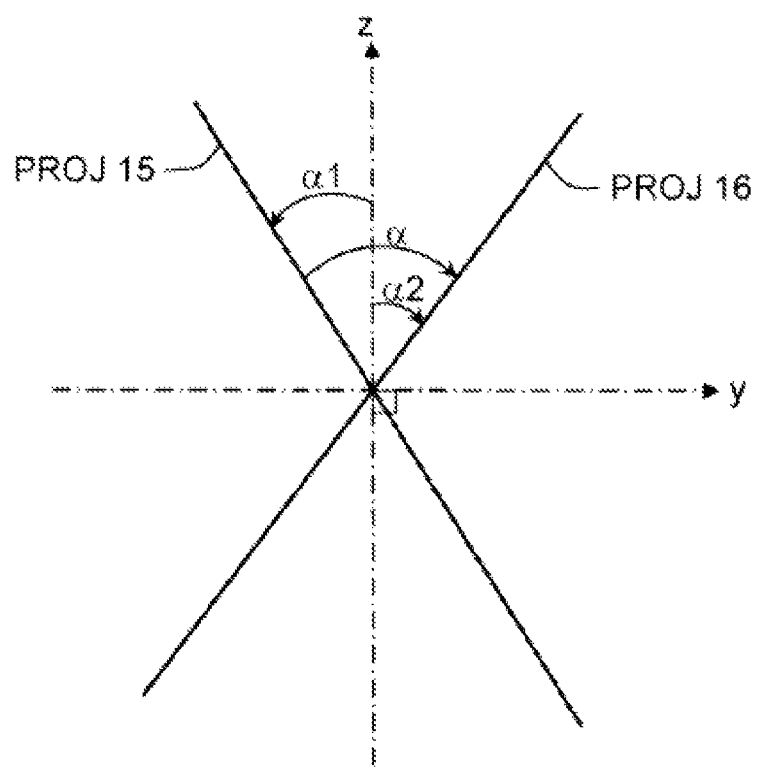

In the nonlimiting example of the figures, in the stabilizing configuration, the orthogonal projections PROJ15, PROJ16 of the stabilizing hangers 15 and 16, respectively, onto the transverse plane (y, z), as are schematically represented in FIG. 9, intersect. They form an angle α between them. This angle is the difference between the directed angle α1 formed by the orthogonal projection PROJ15 of the first stabilizing hanger 15 into the plane (y, z) with respect to the axis z, and the directed angle α2 formed by the orthogonal projection PROJ16 of the second stabilizing hanger 16 into the plane (y, z) with respect to the axis z.

In one variant, in order to change the stabilizing hangers from the resting configuration to the stabilizing configuration, the second end of each stabilizing hanger is moved along the axis y toward a position occupied by the second end of the other stabilizing hanger in the resting configuration. This configuration requires an upper frame CS with a larger dimension along the axis y than the embodiments of the figures, and impairs the compactness of the solution.

In one variant, the projections of the stabilizing hangers onto the transverse plane (y, z) are inclined with respect to one another in the resting position. When changing from the resting configuration to the stabilizing configuration, the absolute value of the angle α formed between the projections PROJ15 and PROJ16 of the two hangers increases.

As a variant, in the stabilizing configuration the orthogonal projections of the stabilizing hangers 15, 16 onto the transverse plane (y, z) do not intersect.

Advantageously, when the orthogonal projections of the stabilizing hangers do not intersect in the stabilizing configuration, they are inclined in the opposite direction with respect to the axis z.

In another variant, the stabilizing hangers 15, 16 are only capable of being in the stabilizing configuration. However, the stabilizing lines may form an obstacle to the passage of the vessel N in coming next to the cradle. Furthermore, since the projections of the stabilizing hangers do not intersect in the stabilizing configuration, the dimension of the upper frame CS along the axis y must be greater if the intention is to obtain the same inclination between the projections of the hangers onto the plane (y, z) as when these projections intersect.

Figure 10:
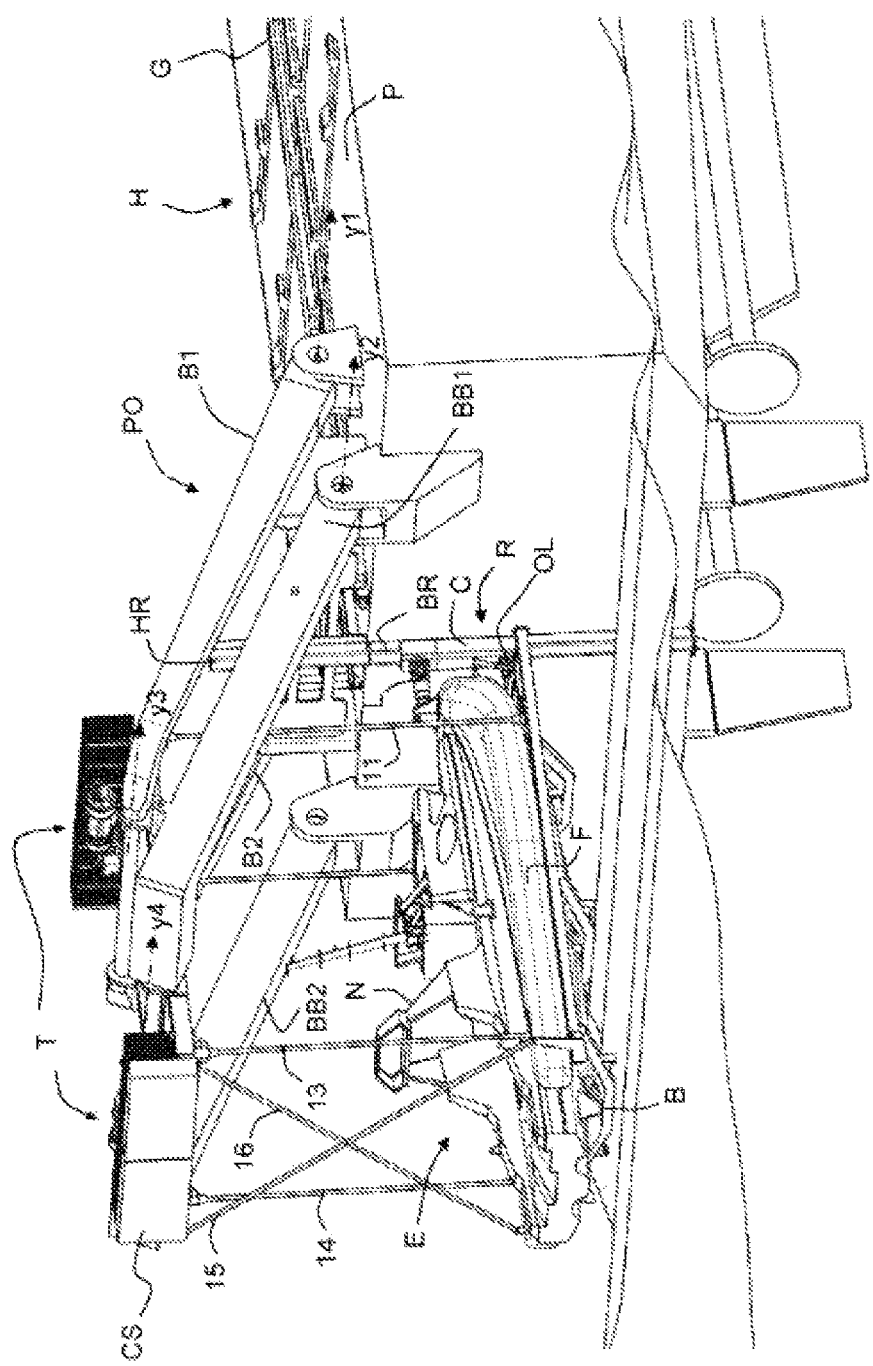
FIG. 10 is a schematic illustration, in perspective, of the device for recovering a vessel according to the invention, in the reception configuration, when the cradle is in a raising orientation and the unit is above the level of the sea.
Figure 11:
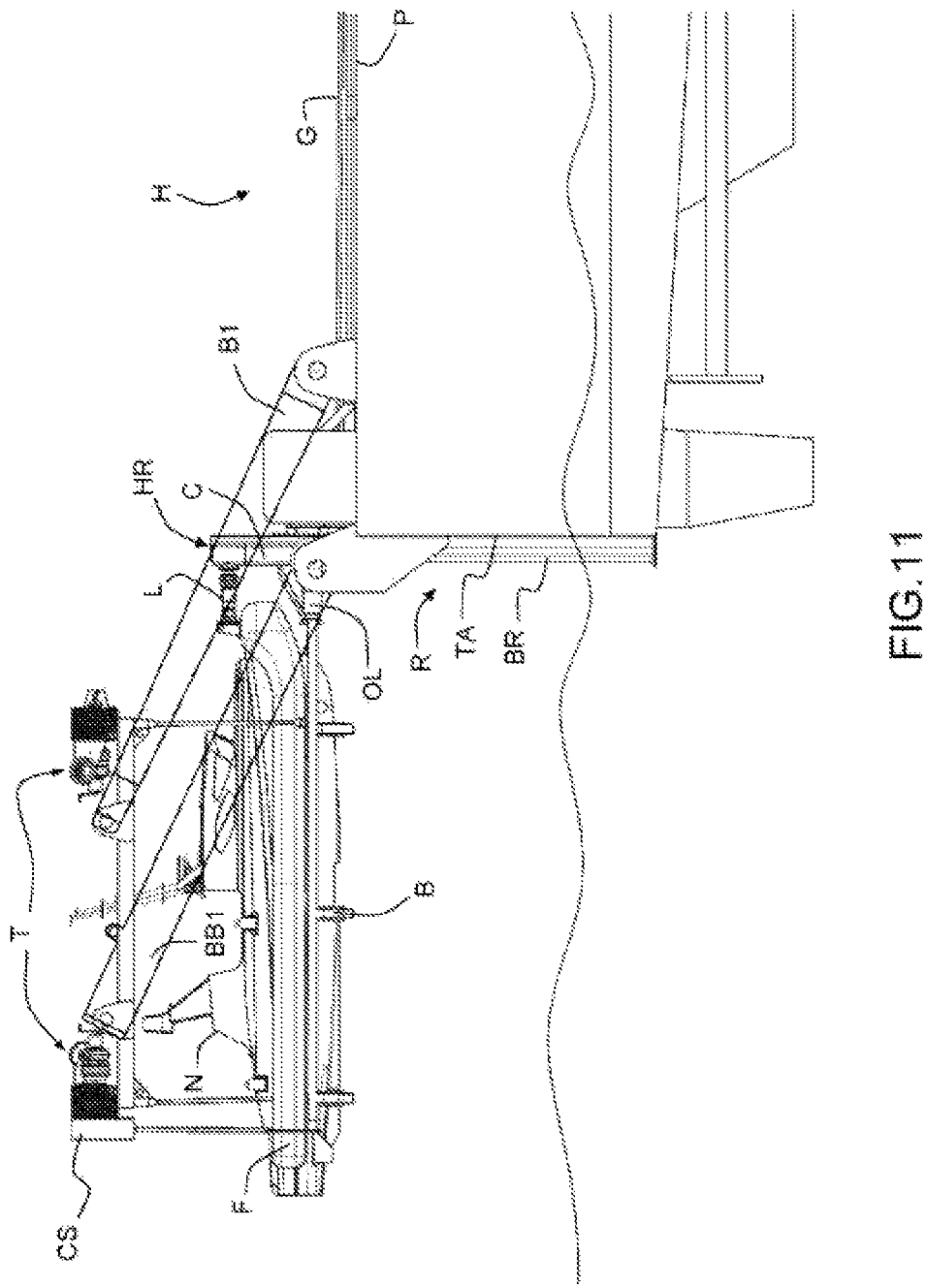
FIG. 11 is a schematic illustration, in side view, of the device for recovering a vessel according to the invention, in the reception configuration, when the cradle is in a raising orientation and reaches the level of an upper part of a guide rail.

In FIG. 10, the unit E is at an intermediate height between the level of the sea and the level of the deck P.

Figure 12:
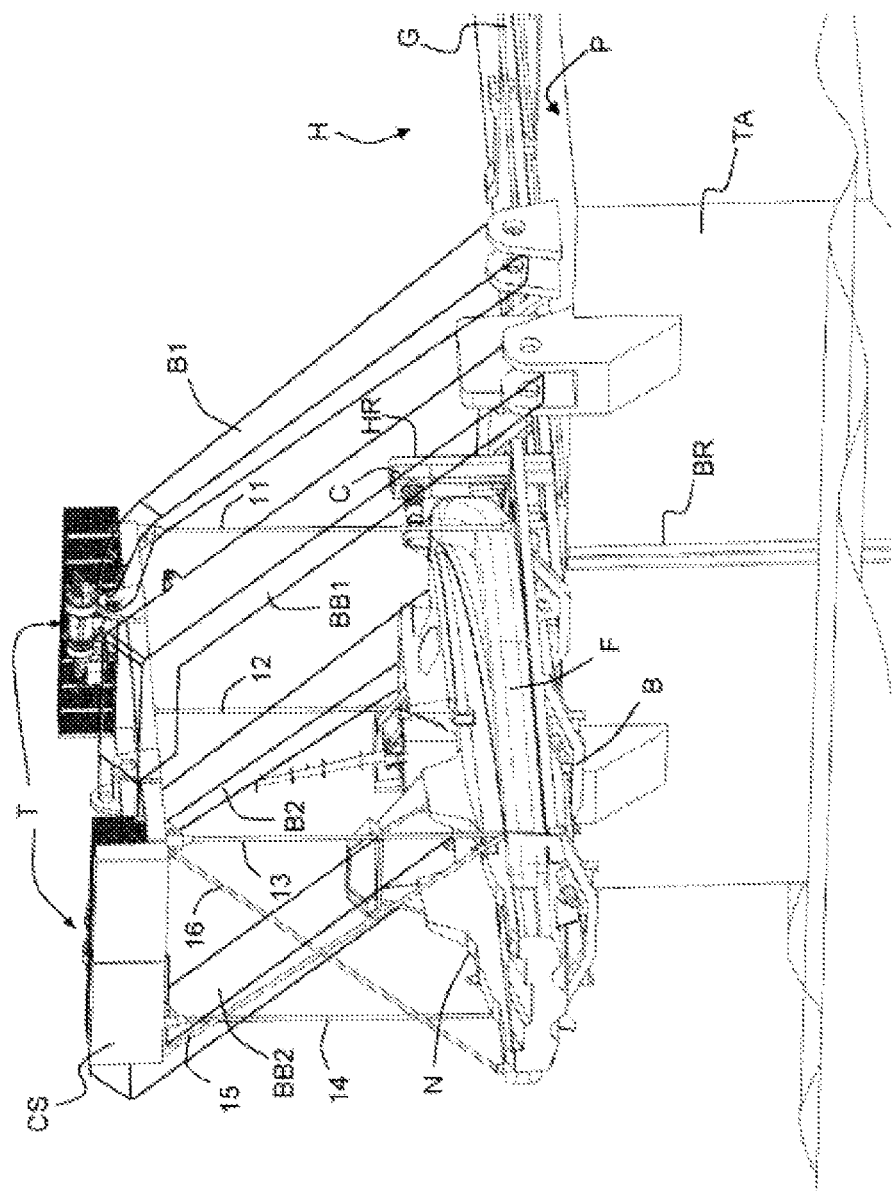
FIG. 12 is a schematic illustration, in side view, of the device for recovering a vessel according to the invention after sliding of the unit along a guide extending along the deck of the vessel.

Preferably, as may be seen in FIG. 10, the rail R comprises a lower part BR located below the freeboard of the host ship and an upper part HR located above the freeboard of the vessel. The upper part HR of the rail can be separated from its lower part BR and is capable of sliding along a guide G, for example, along the axis x. Thus, when the unit E has been raised by translation along the rail R to the raised position and therefore to the upper part HR of the rail R, as may be seen in FIG. 11, the upper part HR of the rail is detached from the lower part BR and slides along the guide G, as may be seen in FIG. 12, in order to move the unit E to a stowing position in which the unit E entirely faces the deck P and rests on the deck P. Thus, the manipulated unit E always remains engaged with the host ship H.

The upper frame CS is, for example, connected to the host ship H so that it can be moved from a reception position, in which it is located beside the deck of the vessel or the rail R, along the axis x to a stowing position in which the upper frame CS is above the deck P of the vessel. Preferably, the upper frame CS keeps its orientation about the three axes x, y, z with respect to the host ship H.

As may be seen in FIG. 10, the upper frame CS is, for example, connected to the host ship H by a gantry PO with double arms spaced apart symmetrically from one another with respect to the plane (x, z). Each double arm comprises a first arm B1, B2 mounted pivoting with respect to the bridge P of the host ship H about the same first individual axis y1 parallel to the axis y, and a second individual arm BB1, BB2 which has the same length as the first arm B1, B2 and is mounted pivoting with respect to the bridge P of the host ship H about the same second individual axis y2, which is parallel to the first individual axis y1 and is spaced apart from the first individual axis y1 along the axis x. The upper frame CS is suspended from the individual arms and is mounted pivoting on each of the individual arms B1, BB1; B2, BB2 about axes y3, y4 substantially parallel to the individual axes y1, y2. The upper frame CS is capable of being moved from its reception position to the stowing position by pivoting of each of the individual arms about its own individual axis while keeping the same orientation with respect to the host ship H.

Each hanger 11 to 16 is a portion of a longer flexible filamentary cable capable of being wound around one of the winches of the set T. A hanger is intended to mean the part of the filamentary cable extending from a first point of the upper frame CS to a second point of the cradle B, on each of which the filamentary cable exerts a traction when the hanger is tensioned, that is to say when it extends linearly from this first point to this second point. In other words, these two points are the points on which the opposite traction forces placing the hanger under tension are exerted. These two points are the two ends of the hanger, that is to say the relevant portion of the filamentary cable. The length of the hangers, that is to say the length of the portion of the filamentary cable forming the hanger, from the first point to the second point, is adjusted by winding the filamentary cable around a drum of a winch or by unwinding it from the drum. The length of the hangers is not intended to be adjusted by extension of the filamentary cable. In other words, the filamentary cable is intended to have a substantially fixed length, and the length of the hangers is intended to vary substantially only by a variation of the length of the filamentary cable from the first point to the second point.

The various hangers 11 to 16 may be formed by separate filamentary cables, or hangers of the set may be formed by the same filamentary cable.

In the example of the figures, the winches of the set T are mounted on the upper frame CS, although as a variant they could be mounted on the deck of the vessel or on the cradle B.

In the example of the figures, the set of hangers 11 to 16 comprises four raising hangers and two stabilizing hangers. As a variant, the set of hangers could comprise a different number of raising and/or stabilizing hangers since they make it possible to slide the cradle B along the rail R and maintain its zero list and adjust its trim.

When the set of raising hangers is under tension, each raising hanger has an orthogonal projection onto the plane (x, y) capable of having a unique predetermined orientation in a calm sea state.

Advantageously, the raising hangers 11 to 14 are arranged so as to be substantially parallel to one another when they are under tension. As a variant, at least one raising hanger 11 to 14 is inclined with respect to another raising hanger when they are under tension.

In the nonlimiting embodiment of the figures, the fastening AR comprises a connecting member OL connecting the first fastening point CT of the hanger to a connecting piece C in sliding connection with the upper frame CS via the guide R in the reception configuration.

Thus, the connecting member OL connects a front region of the cradle B to the connecting member C.

The first fastening point CT is in connection with three degrees of freedom in rotation with the connecting piece C. Advantageously, the connecting member OL establishes a connection with six degrees of freedom (three translations and three rotations) between the cradle B and the connecting piece C. As a variant, the piece C is in ball-and-socket connection with the cradle B or in connection with three degrees of freedom in rotation and with one or two degrees of freedom in translation with the cradle B. Each degree of freedom in translation allows a relative translational movement between the piece C and the cradle B with a predetermined travel.

Advantageously, in the case in which the connecting piece C is in connection with three degrees of freedom in rotation and with one degree of freedom in translation with the cradle B, the degree of freedom in translation is along the axis x.

This embodiment is in no way limiting.

In one variant, the cradle B is linked by the first fastening point CT via a linkage to the host ship H, that is to say to a second fastening point which is fixed with respect to the upper frame CS in the reception configuration, so that the first fastening point CT is in connection with three degrees of freedom in rotation with three degrees of freedom in translation with respect to the second fastening point.

In another embodiment, the device does not have the fastening.

Advantageously, as represented in the figures and as may be seen in FIG. 1, the basket NA comprises a guide float F which is capable of having a predetermined positive buoyancy. The float F is interposed between the cradle B and the upper frame CS so that the cradle B is intended to support the guide float F during the raising of the cradle B under the effect of a length variation of the hangers 11 to 16.

The cradle B is located below the upper frame CS along a vertical axis or along the axis z in a calm sea state.

In other words, the guide float F faces the cradle B and interposed between the cradle B and the upper frame CS along the axis z.

The float F is configured and connected to the cradle B in order to guide a vessel N moving forward on the surface of the water with a speed of movement comprising a positive component along an axis x toward a front part FO of the cradle B. The front part FO of the cradle B is the part of the float FO which is located at the front of the float FO along the axis x in a calm sea state.

The front part of the float FO is preferably located substantially next to the front end E1 of the cradle B or of the bearing region ZS of the cradle B.

The guide float F is in connection with at least three degrees of freedom in rotation with the cradle B.

This freedom allows the guide float F to move with respect to the cradle B. Thus, during the reception step represented in FIG. 3, during which the cradle B with negative buoyancy is in the receiving orientation, the float F rests on the surface S of the water. There is therefore a certain distance between the float F and the cradle B along the axis z, this distance increasing from the front toward the rear of the float F. This distance makes it possible to ensure good safety during the phase of receiving the vessel. It limits the risks of bumping between the vessel N and the cradle B, particularly of the lower part of the vessel N.

Advantageously, the guide float F is mobile in translation with respect to the cradle B along the axis z, the axis z being vertical in a calm sea state. This makes it possible to limit the risks of shocks between the vessel N and the cradle B, the heavy cradle B being capable of moving away from the float F when it is immersed by translation along the axis z with respect to the float F while consequently lengthening the hangers, which makes it possible to leave free a volume with a larger size, in particular a larger depth, in order to receive the vessel N.

The translation of the float F with respect to the cradle B may be allowed with a predetermined maximum amplitude along the axis z, or may be free.

Advantageously, the float F is in connection with 3 degrees of freedom in translation of the float F with respect to the cradle B.

Each translational movement along an axis perpendicular to the axis z may be allowed with a predetermined maximum amplitude along this axis.

To this end, in the nonlimiting example of the figures, the float F is connected to the cradle B by means of the connecting piece C. The front FO of the float F is connected to the connecting piece C by a second connecting member L. The second connecting member L establishes a connection with six degrees of freedom (three translations and three rotations) between the float F and the connecting piece C, and allows each of these movements freely or with a predetermined maximum amplitude. As a variant, the float F is in ball-and-socket connection with the connecting piece C or in connection with three degrees of freedom in rotation and with 1 or 2 degrees of freedom in translation. This variant is less advantageous in terms of risks of shocks between the vessel N and the float F.

As a variant, the float F is free in translation along the axis z with respect to the hanger B. In other words, it is capable of sliding with respect to the frame along the axis z independently of the cradle B. During the phase of receiving the vessel N, this makes it possible to leave a larger volume under the float, between the float and the cradle B, while making it possible to immerse the cradle B as deeply as desired.

For example, the float F is connected to the rail R via a second connecting piece in sliding connection with the rail R. The second piece is unconnected with the first connecting piece, so that it can slide along the rail R independently with respect to the cradle B.

As a variant, the float F is in connection with three degrees of freedom in rotation with the cradle B and no degree of freedom in translation with the cradle B.

The recovery device D comprises a third connecting member LL making it possible to attach the bow PR of the vessel N, also referred to as the nose of the vessel N in the case of submarines, to the float FO, preferably to the front FO of the float F, when the vessel N arrives next to the front FO of the float or in abutment on the front FO of the float F.

This third connecting member LL thus makes it possible to connect the vessel N to the host ship H, which then tows the vessel N.

The vessel N attached to the float F faces the cradle B, with the bow P toward the front along the axis x.

The bow PR is located substantially next to the first longitudinal end E1 of the cradle B.

Advantageously, the third connecting member LL establishes a ball-and-socket connection between the vessel N and the front part FO of the float F or a connection with 6 degrees of freedom allowing movements of the vessel N in 6 degrees of freedom with a predetermined maximum amplitude for each degree of freedom. Consequently, even once the vessel N is attached by its bow PR to the host ship H, the vessel N has freedom of movement in rotation and optionally along the three translational axes with respect to the vessel, which makes it possible to avoid subjecting it to excessive forces.

The third connecting member LL comprises, for example, a snap link or a hook device which connects the vessel to the float under the effect of traction of the vessel N over a predetermined region of the front part FO of the float. The third connecting member LL may be passive.

As a variant, the recovery device comprises means for detecting traction of the vessel over the predetermined region of the front part FO of the float, and the control means COM are configured to control the connecting element so that it comes to connect the vessel to the float when traction of the vessel over the front part region of the float is detected by the detection means.

The float F has, for example, an overall U-shape comprising a bottom FO arranged substantially next to the front end of the cradle B or the front of the bearing region of the cradle B in a calm sea state. The float F comprises two lateral parts A1 and A2 which each extend longitudinally from the bottom FO, comprising the stop BU, to a free or rear end EA1, EA2 located behind the bottom F along the axis x, the lateral parts A1, A2 being separated by a plane which is parallel to the axes x and z and passes through the bottom FO in a calm sea state. The vessel N then enters the space delimited by the float F through an opening OV delimited by the rear ends of the lateral parts EA1 and EA2.

The float F comprises, for example, a continuous tube in an overall U-shape having a positive buoyancy, or a set of tubes capable of having the predetermined positive buoyancy, which are connected to one another so as to form the overall U-shape. The tubes adjacent along a curve with an overall U-shape may be contiguous or spaced apart from one another.

Advantageously, when it has the predetermined positive buoyancy, the float F is resiliently deformable so as to absorb the impacts, that is to say absorb the energy of the impacts, between the vessel N and the float F, in particular when the vessel N is inside the volume delimited by the guide float. Thus, the vessel N does not encounter any rigid element before being attached to the float F.

The float F comprises, for example, a closed flexible skin capable of containing air and of having the overall U-shape. The float F may be capable of being alternately inflated, in order to have the predetermined positive buoyancy, and deflated.

As a variant, the float comprises a U-shaped structure coated with a flexible external skin which is resiliently compressible so as to absorb the energy of impacts between the vessel N and the float F when the vessel N approaches the float F and when it enters the volume delimited by the lateral parts EA1 and EA2 and the bottom FO of the float F.

The float F is advantageously configured and connected to the cradle B in order to limit the movements of the vessel N with respect to the cradle B along the axis y in a calm sea state. In this way, the longitudinal axis l of the vessel N is substantially contained in the plane (z, l) in a calm sea state.

Figure 8:
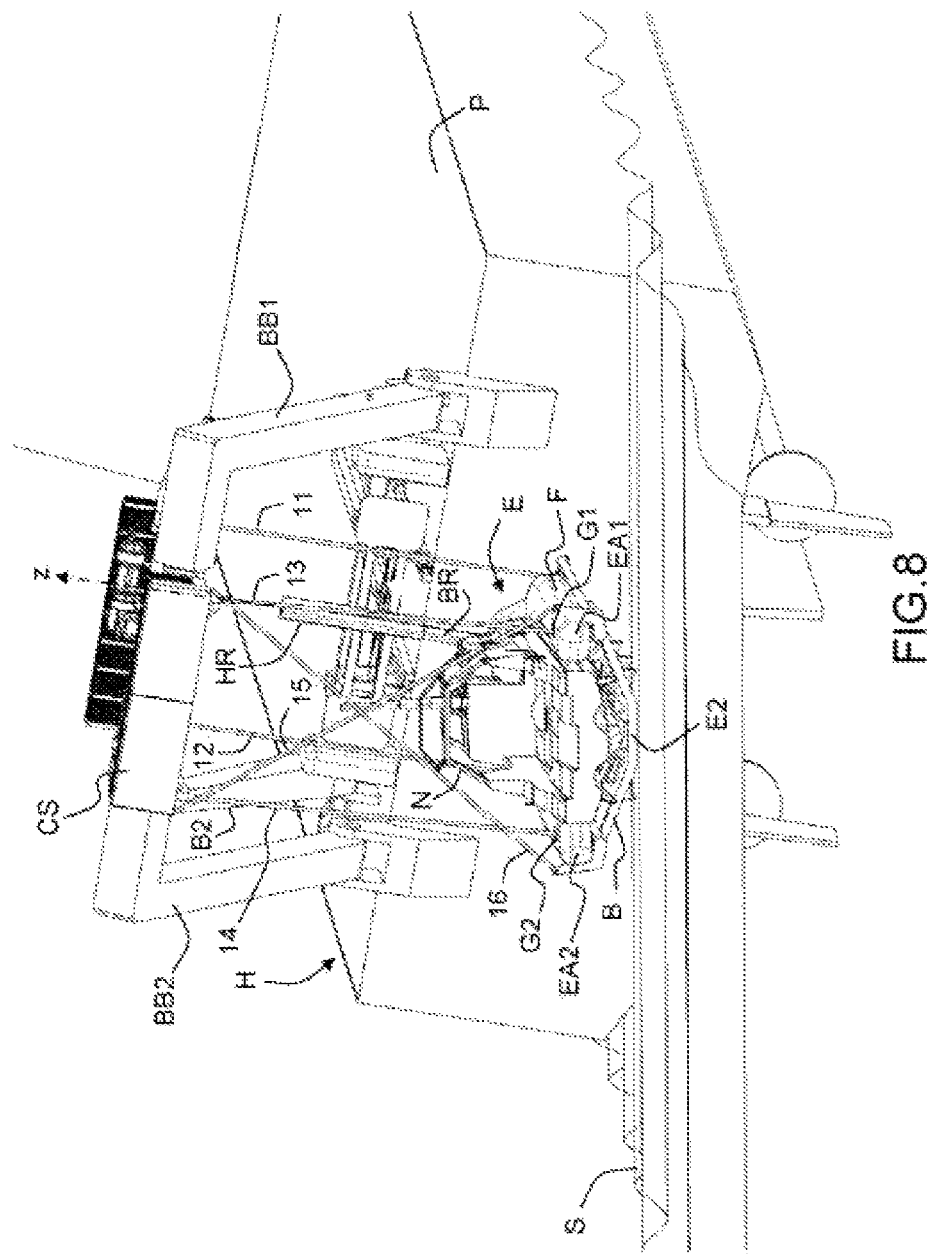

In the nonlimiting example of the figures, the lifting device comprises two openings G1, G2, which may be seen in FIG. 8, formed in the float F.

The lifting device comprises two connecting hangers 13 and 14, taken from among the hangers 11 to 16, which connect the cradle B to the upper frame CS. Each connecting hanger 13, 14 connects the cradle B to the upper frame CS while passing through an opening G1, G2 which is formed in the float F and fully encloses the connecting hanger 13 radially.

In other words, two openings G1, G2 are formed in the float F and are entirely delimited by the float. Each connecting hanger 13, 14 passes through one of these openings G1, G2.

Each opening G1, G2 is advantageously configured and arranged so that each connecting hanger 13, 14 is capable of extending substantially linearly, that is to say along a single straight line, in a calm sea state when it is under tension.

Passing the connecting hangers 13, 14 through the float F makes it possible to limit an amplitude of a rotation of the float F with respect to the cradle B about an axis perpendicular to the axis z of the rail.

This makes it possible to facilitate the approach of the vessel N. Furthermore, once the vessel N is engaged between the lateral parts of the float F and when its bow PR is connected to the float F, the connection of the cradle B to the frame through the float F makes it possible to bring the longitudinal axis 11 of the vessel N toward the plane (x, z) in a calm sea state with relative flexibility, before the vessel N rests on the cradle B. This is because the flexibility of the connecting hangers 13, 14 allows a certain degree of oscillation of the vessel N about the axis z but the tension of the connecting hangers 13, 14 brings the longitudinal axis 11 of the vessel N toward the plane (x, z) in a calm sea state. This configuration therefore makes it possible to orientate the vessel N with flexibility in the direction that allows it to cooperate optimally with the cradle B, when the cradle B is being brought into the raising orientation then is raised. The connecting hangers serve as a guide for the cradle B.

Advantageously, the connecting hangers 13, 14 exert vertical tractions on the cradle B substantially at the level of the rear end E2 of the cradle B. This makes it possible to promote the flexible placement allowed by the connecting hangers.

Advantageously, the connecting hangers 13, 14 comprise two hangers exerting vertical tractions on the cradle B at points at a distance from one another along the axis y when they are tensioned. In the nonlimiting example of the figures, the first opening G1 passes through the first lateral part A1 and the second opening G2 passes through the second lateral part A2.

Advantageously, the lifting device comprises two connecting hangers 13, 14 that are capable of being separated by a plane (x, z) which passes through the front FO in a calm sea state. This makes it possible to ensure symmetrical stabilization of the float F around the plane (x, z).

The device could, as a variant, comprise a single connecting hanger or more than two connecting hangers.

In the example of FIGS. 1 to 12, the float F has an angular aperture around an axis which is capable of being parallel to the axis z in a calm sea state, and a length along the axis x, which are substantially fixed when it has the predetermined positive buoyancy.

As a variant, the float has a variable angular aperture around an axis which is capable of being parallel to the axis z in a calm sea state, and/or a variable length.

In the example of FIG. 3, the float FF differs from that of the previous figures in that it has a variable angular aperture. Furthermore, the device differs from that of the previous figures in that it does not comprise stabilizing hangers. As a variant, it could comprise stabilizing hangers.

Figure 13:
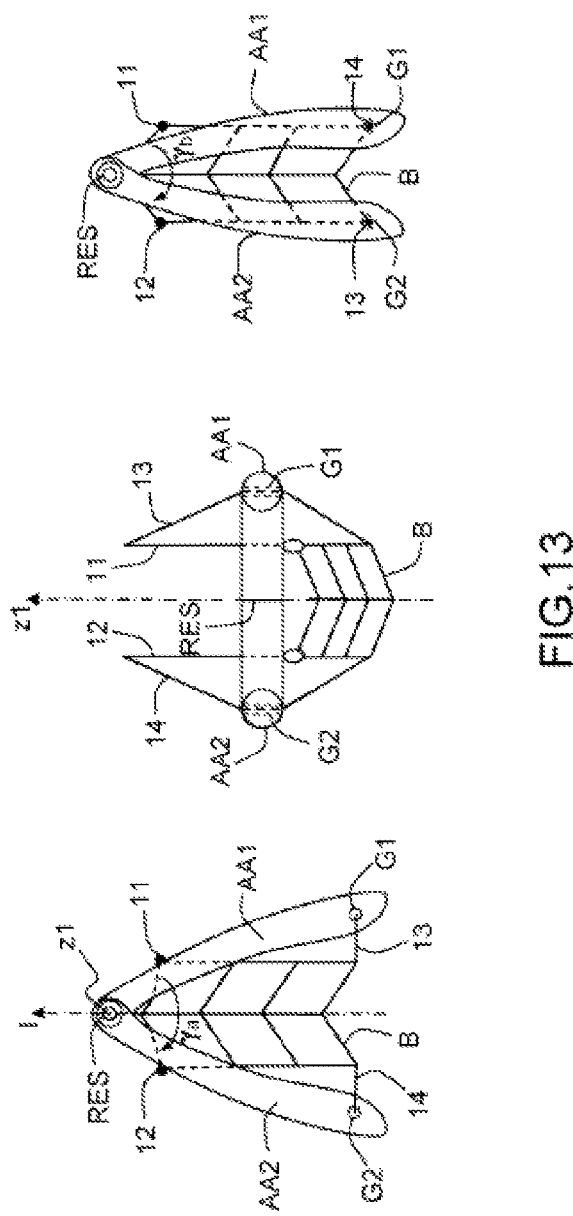
FIG. 13 is a schematic representation, in top view, of a cradle linked to a float having a variable angular aperture, in a top view (left), in a rear view (middle) and in a top view after reduction of the angular aperture of the float (right).

Its two lateral parts AA1 and AA2 are capable of pivoting with respect to one another about an axis z1 which is capable of being parallel to the axis z in a calm sea state. The lateral parts are connected by a torsion spring RES, which tends to give the float F a large receiving angular aperture γa, as represented schematically in a top view on the left view in FIG. 13 and in the rear view on the central view. The angular aperture γa is obtained under the effect of suitable lengthening of the connecting hangers 13, 14 making it possible to relax the connecting hangers 13, 14, which allow the lateral parts AA1 and AA2 to move apart under the effect of the force exerted by the spring. The connecting hangers 13 and 14 extend along a curved line comprising two substantially straight lines. By the length of the connecting hangers 13, 14 being reduced, the angular aperture of the float F decreases under the effect of a reduction of the length of the hangers 13 and 14, placing them under tension, until the float F has a raising angular aperture γh which may be seen on the right view, for which the connecting hangers 13 and 14 are tensioned and extend linearly, that is to say they each extend linearly along a single straight line.

The connecting hangers 13 and 14 are advantageously, but not necessarily, substantially parallel to one another when the float F has the raising angular aperture γh.

Advantageously, the cradle B comprises at least one shock absorber AM making it possible to dampen an impact between the cradle B and the region of the vessel N when the cradle B is lifted in order to bring it to bear against the vessel N.

The basket NA may assume different forms, depending on the type of craft which it is intended to transport. The basket NA, for example, does not have a float F, the basket NA, which is then fully submersible, being adapted for the recovery of submarine craft, or the float F is integrated with the cradle B so that the cradle B floats, the basket then floating and being adapted for the recovery of floating craft.

In the example of the figures, the guide is a rail R. The guide may be a different type of guide, for example a pantograph or a hydraulic guiding system.

In the example of the figures, the float F is connected to the same guide R as the cradle B. As a variant, the float is connected to a second guide, the function of which is the same, namely to guide the float F in translation along the axis z.

As a variant, the device comprises a mooring line connecting the front part FO of the float F to a point which is fixed with respect to the upper frame CS.

As a variant, the float F is connected to the cradle B only by one or more connecting hangers.

As a variant, the set of hangers does not have stabilizing hangers.

The control means may comprise at least one memory and at least one processor. The control means are then provided in the form of one or more stored software programs, each computer program being stored in a memory of the computer and comprising code instructions executable by a processor.

As a variant, the control means may be provided in the form of one or more dedicated integrated circuits or ASICs (Application-Specific Integrated Circuits) or one or more programmable logic components, for example of the FPGA (Field-Programmable Gate Array) type, which are configured or programmed to generate the command(s) which it needs to generate.

The invention relates to a recovery assembly comprising a surface station and a recovery device according to the invention, which is mounted on the surface station. The invention also relates to a marine assembly comprising the recovery assembly and the vessel N.

The invention claimed is:

1. A recovery device for recovering a vessel at sea from a surface station, the recovery device comprising:
   a cradle with negative buoyancy, intended to support the vessel,
   a lifting device comprising an upper frame and a set of hangers connecting the cradle to the upper frame, lengths of the hangers being variable so as to make it possible to raise and lower the cradle, a guide float capable of having a predetermined positive buoyancy, the guide float being interposed between the cradle and the upper frame so that the cradle is intended to support the guide float during raising of the cradle, the guide float being configured and connected to the cradle in order to guide the vessel toward a front part of the guide float when the guide float has the predetermined positive buoyancy, the guide float being in connection with three degrees of freedom in rotation with the cradle, and further comprising a connecting member with three degrees of freedom in rotation, which is capable of mechanically connecting a bow of the vessel to the front part of the guide float, and a first connecting piece in connection with three degrees of freedom in rotation with the cradle, a guide making it possible to guide the first connecting piece in translation with respect to the upper frame, during a variation of the lengths of the hangers, along an axis z associated with the upper frame.

2. The recovery device as claimed in claim 1, wherein the guide float is mobile in translation relative to the cradle along an axis z associated with the upper frame, the axis z being vertical in a calm sea state.

3. The recovery device as claimed in claim 1, wherein the guide float is resiliently deformable so as to dampen shocks between the vessel and the guide float.

4. The recovery device as claimed in claim 1, wherein the set of hangers comprises a first connecting hanger passing through a first opening formed in the guide float, the first opening fully enclosing the first connecting hanger radially.

5. The recovery device as claimed in claim 4, wherein the front part of the guide float is defined along an axis x which is associated with the upper frame and is horizontal in a calm sea state, the set of hangers comprising a second connecting hanger passing through a second opening formed in the guide float, the second opening fully enclosing the second connecting hanger radially, the first connecting hanger exerting on the cradle a vertical traction at a point, at a distance along an axis y which is associated with the upper frame, is perpendicular to the axis x and is horizontal in a calm sea state, from another point at which the second connecting hanger exerts a vertical traction on the cradle when the first connecting hanger and the second connecting hanger are under tension.

6. The recovery device as claimed in claim 1, wherein the front part of the guide float is defined along an axis x which is associated with the upper frame and is horizontal in a calm sea state, the guide float having an overall U-shape comprising a bottom arranged substantially next to the front of the cradle and two lateral parts which each extend longitudinally from the bottom to a rear end located behind the bottom along the axis x, the lateral parts being separated in a calm sea state by a vertical plane comprising the axis x and passing through the bottom.

7. The recovery device as claimed in claim 1, comprising a first connecting member connecting a front region of the cradle to the first connecting piece.

8. The recovery device as claimed in claim 1, comprising:
a second connecting piece in connection with three degrees of freedom in rotation with the guide float,
an other guide making it possible to guide the second connecting piece in translation with respect to the upper frame, during a variation of the lengths of the hangers, along an axis z associated with the upper frame (CS).

9. The recovery device as claimed in claim 8, comprising a second connecting member connecting a front region of the guide float to the second connecting piece.

10. The recovery device as claimed in claim 8, wherein the second connecting piece and the first connecting piece are made from a same mechanical part and the other guide and the guide are made from a same mechanical part.

\* \* \* \* \*